Sept. 3, 1957   E. PECKHOVER   2,804,686
CHEESE AND BUTTER SLICER
Filed Jan. 12, 1956

INVENTOR
Elisabeth Peckhover
BY
ATTORNEY

# United States Patent Office 2,804,686
Patented Sept. 3, 1957

2,804,686

CHEESE AND BUTTER SLICER

Elisabeth Peckhover, Willowdale, Ontario, Canada

Application January 12, 1956, Serial No. 558,807

2 Claims. (Cl. 30—280)

This invention relates to a cheese and butter slicer.

The invention is more particularly concerned with an improved device in the general form of a cake server which embodies a supporting plate or blade and a handle projecting therefrom, and a primary object of the invention is to provide the said plate with improved means for cutting butter or cheese in slices as well as in squares if such be desired, whereupon the slices or squares may be transported by the plate.

A further object of the invention is a device of the above noted general character which is simple in construction, durable in use, and efficient in operation.

Other objects and advantages of the invention will become apparent in the course of the following detailed description, taken in connection with the accompanying drawing, wherein—

Figure 1:
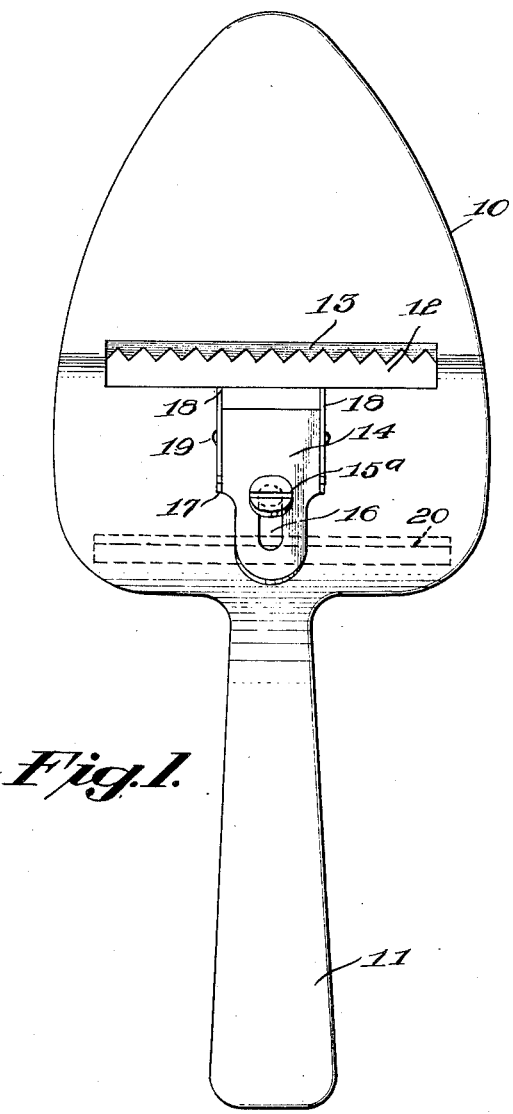
Fig. 1 is a top plan view of the improved device in accordance with a preferred structural embodiment thereof.

Referring now in detail to the drawing, the device will be seen to comprise a blade or plate 10 of the general form of the well known cake serving plate or blade, having a relatively wide rear end portion and a relatively narrow front end portion and the said blade is provided with a handle 11.

Figure 2:
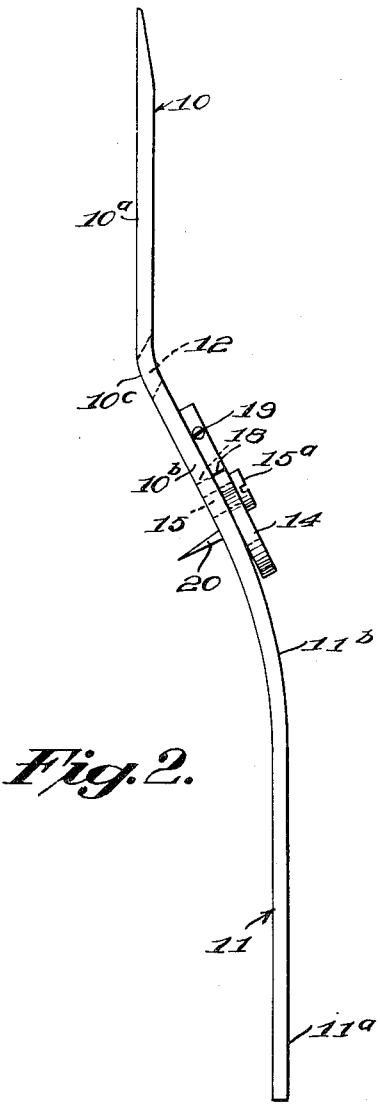
Fig. 2 is a side elevational view of the device as observed from the left of Fig. 1.

From Fig. 2 it will be observed that the front end portion 10a of the blade is plane and the rear end portion 11a of the handle is likewise plane, the said plane portions 10a and 11a are disposed in spaced parallel planes through an intermediate portion including a relatively flat portion 10b included in the rear relatively wide portion of the blade and which is diagonal to the portions 10a and 11a, and the said flat portion 10b merges into the said portion 10a through a relatively short curve 10c and also merges into the portion 11a through a relatively long curve 11b.

A relatively narrow slot 12 extends transversely of the plate 10 with the front and rear edge walls thereof disposed at an angle to portion 10a and the slot is disposed in the curved portion 10c.

The front edge of the slot 12 is a cutting edge and may be straight or serrated as indicated at 13, and such edge cuts a slice upon the device being drawn over a piece of butter or cheese.

In order to further cut the slices into squares, a block 14 is supported on the flat portion 10b for adjustable movement toward and away from the slot 12. The block is supported for such movement by means of a screw 15 supported in said portion 10b and extending through a slot 16 in the block with the head 15a of the screw bearing on the upper face of the block.

The portion 10b is provided with a pair of laterally spaced parallel slots 17 which intersect the slot 12 and a knife 18 is disposed in each of such slots and secured to a respective side of the block 14 by means of a screw 19.

The knives 18 normally have their forward ends disposed at the rear edge of slot 12 as indicated but upon forward sliding of the block 14 such knives will extend across slot 12 to cut the slices of cheese or butter transversely thereof.

The blade 10 may be provided with a knife 20 projecting inwardly thereof for use in transversely severing slices or for other cutting purposes.

Having set forth my invention in accordance with a preferred structural embodiment thereof, what I claim and desire to secure by U. S. Letters Patent is:

1. A butter and cheese slicing and cutting device comprising a blade including a front plane portion and a rear plane portion disposed in acute angular relation to the front plane portion, said blade further including a relatively narrow curved portion extending transversely thereof and rigidly connecting said front and rear plane portions, said blade being provided with a slot extending transversely thereof and being disposed in said curved portion, said slot extending through the blade and whose opposite front and rear walls are parallel and inclined rearwardly, from the top wall to the bottom wall of the blade, the foremost of said slot walls providing with the bottom wall of the blade a cutting edge, said rear plane portion being provided with a pair of laterally spaced slots disposed in planes normal to said first slot and intersecting same, and a knife adjustably supported in each of said pair of slots for movement into a position transverse to and extending across said first slot and to a position to clear said slot whereby upon drawing the front plane portion of the blade over the surface of a mass of butter or cheese with said knives in retracted position, a slice of butter or cheese will be cut and upon such drawing of the blade over said surface with the knives intersecting said first slot, a plurality of squares of butter or cheese will be cut.

2. The structure according to claim 1, together with a block disposed on the top wall of said rear plane portion intermediate said pair of slots therein, said knives being secured to opposite sides of the block, said block being provided with a slot intermediate its opposite side walls in parallelism with said knives, and a headed screw extending through said last slot and threaded into said rear plane portion for effecting adjustment of the knives relative to said first slot.

References Cited in the file of this patent

UNITED STATES PATENTS

| | | |
|---|---|---|
| 954,444 | Leen | Apr. 12, 1910 |
| 1,668,478 | Anderson | May 1, 1928 |